Patented Apr. 11, 1950

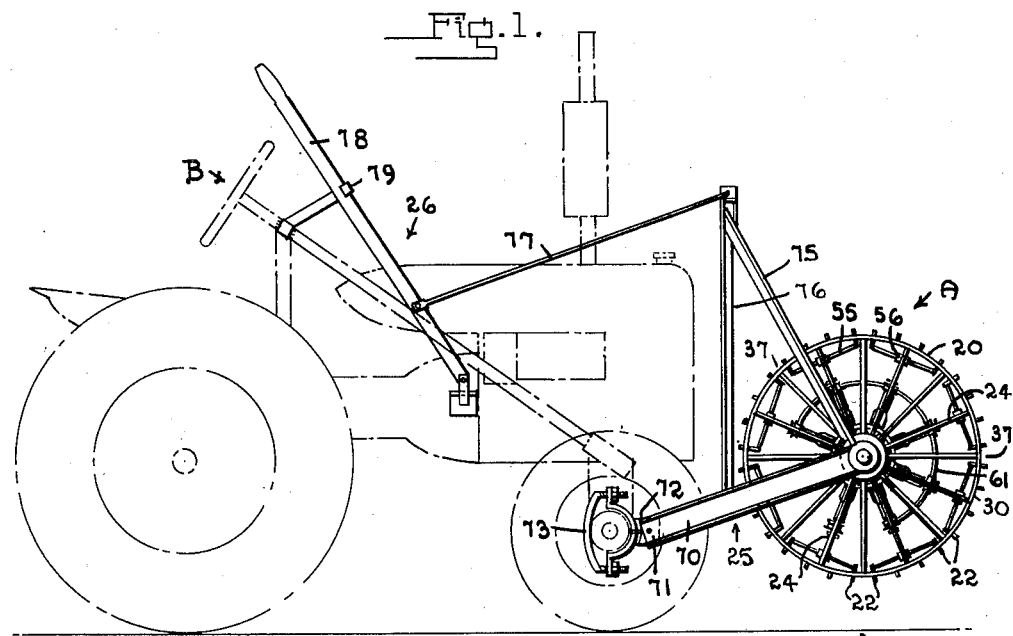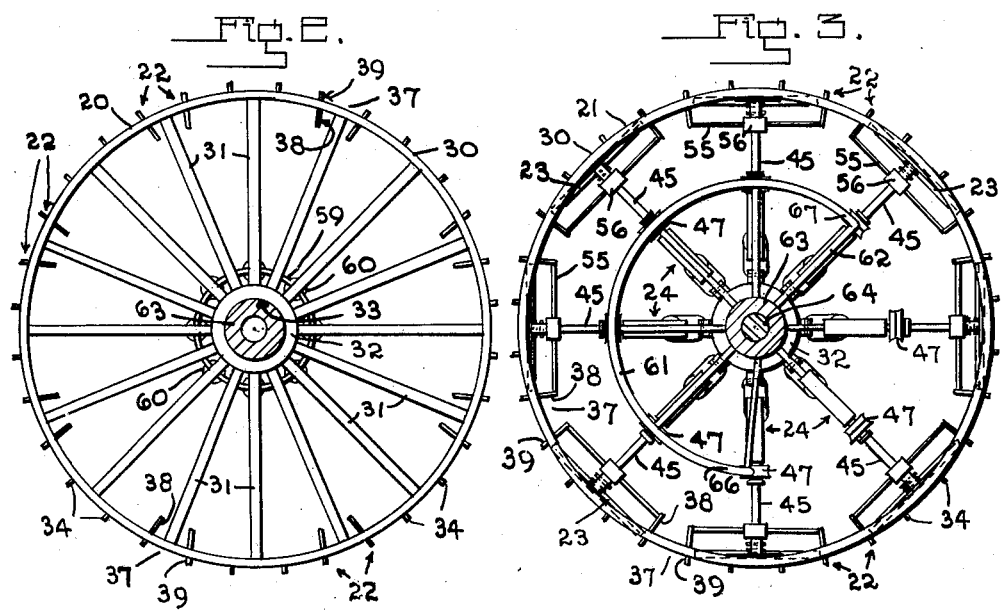

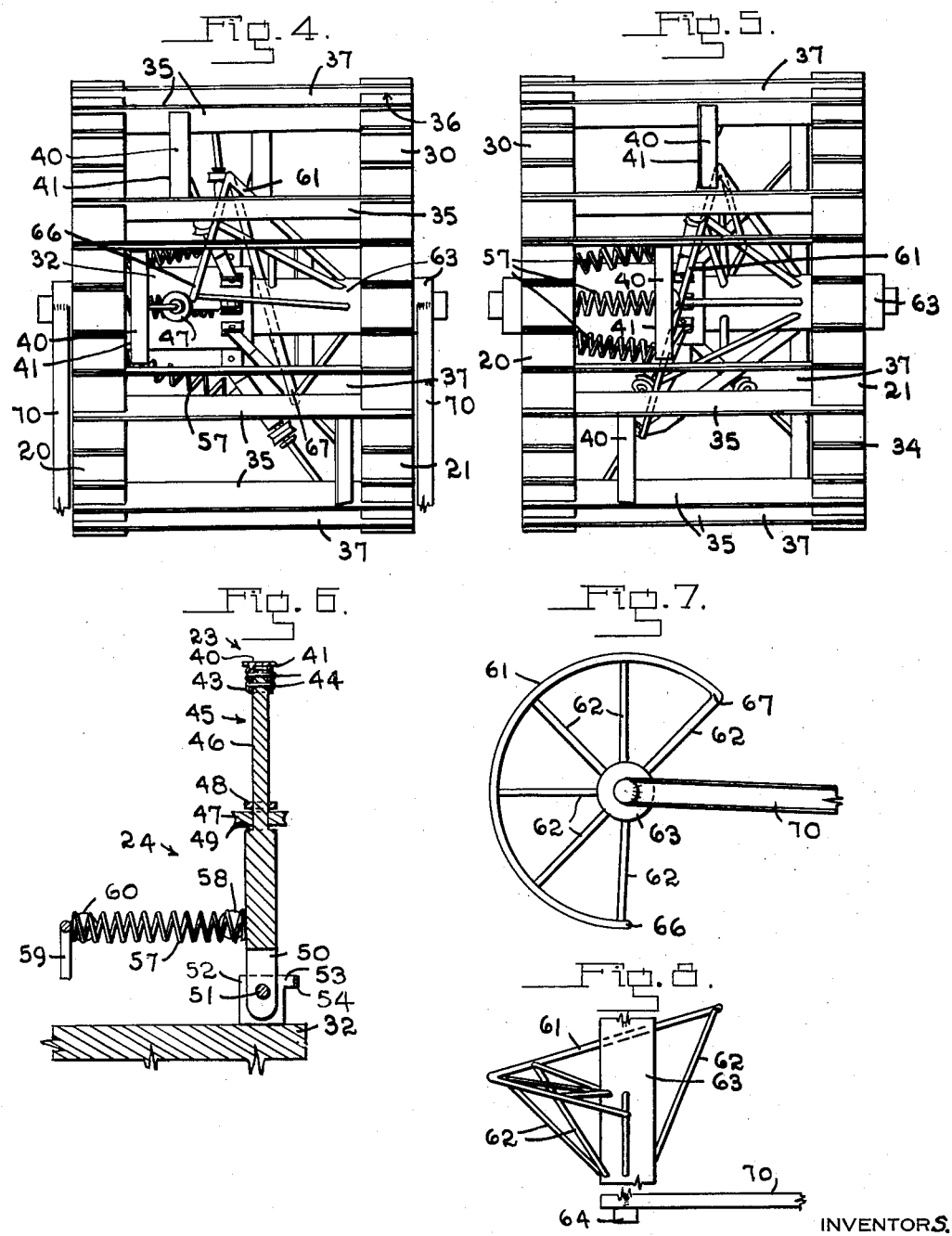

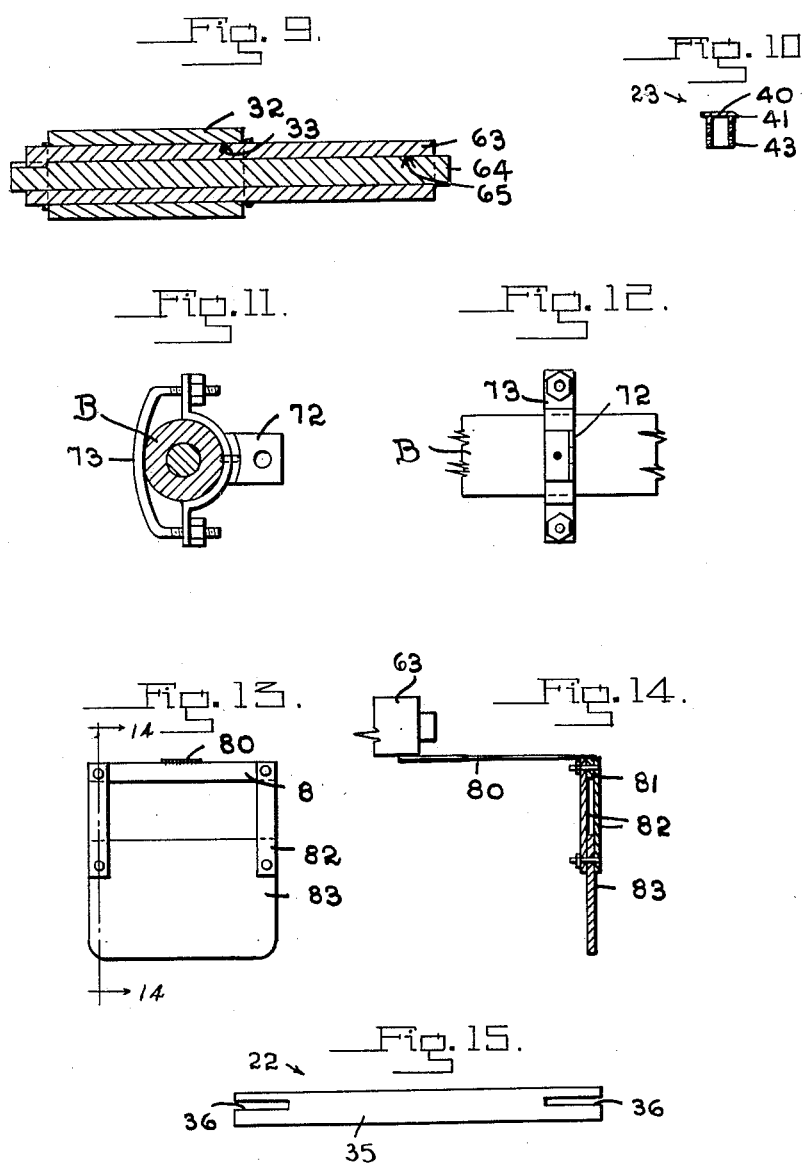

2,504,004

UNITED STATES PATENT OFFICE 2,504,004

ROLLING COTTON CHOPPER

Lucian R. Dabbs, Quincy, and Lawrence R. Palmer, Amory, Miss.

Application April 26, 1946, Serial No. 665,101

2 Claims. (Cl. 97—22)

This invention relates to agricultural machinery and more specifically to such machinery employed to block out rows of plants. One use of the machine herein disclosed is as a cotton chopper.

An important object of the invention is to provide a machine which will thin rows of plants by removing plants from the rows at accurately-spaced distances apart, yet will not damage the plants left in the rows.

Another important object is to provide a wheeled machine, adapted to be hitched to a vehicle, such as a tractor, for the purpose of accurately blocking out rows of plants, such as cotton.

Still another important object is to provide a chopper which will cut vegetation in a clean, efficient way, over a defined area of a row.

A major object is to provide a chopper which will not be apt to become clogged with vegetation cut thereby and which chopper is not noisy in operation, but is positive in action and not likely to get out of order.

Other objects and advantages of the invention will be apparent during the followoing detailed description of the invention, taken in connection with the accompanying drawings, forming a part of this specification and in which drawings:

Figure 1 is a side elevation of the novel wheeled chopper, hitched to a tractor, with the chopper in a raised position.

Figure 2 is a view, mostly in elevation, of a spoked ground wheel of the chopper with a second ground wheel and the chopping means associated with the wheels removed.

Figure 3 is a somewhat similar view but with the second wheel and the chopping means in elevation and the first wheel removed to better illustrate the construction of the chopping means.

Figure 4 is a bottom plan of the new chopper.

Figure 5 is a forward or front elevation thereof.

Figure 6 is a vertical section through one of the knife carriers or knife supports of the chopper wheel.

Figures 7 and 8 are elevation and plan views respectively of the cam track, and associated structure, for actuating the chopping means.

Figure 9 is a longitudinal section through the hub and shaft portions of the novel chopper.

Figure 10 is a section through one of the chopper knives.

Figures 11 and 12 are views illustrating a connecting means between the chopper and draft vehicle.

Figures 13 and 14 are views illustrating a desirable mould board for association with the chopper.

Figure 15 is a plan view of a means for connecting together the wheels of the chopper.

In the drawings, wherein for the purpose of illustration is shown a preferred embodiment of the invention and wherein similar reference characters designate corresponding parts throughout the several views, the letter A designates the novel chopper generally, and the letter B a vehicle adapted for attachment thereto.

The chopper A includes, preferably, a pair of spaced-apart ground wheels 20 and 21 with their axes of rotation substantially coincident; means 22 connecting the wheels 20 and 21; a plurality of chopping knives 23 operatively carried by the wheel 20; means 24 to actuate the knives 23; guide means 25 to couple the chopper A to a suitable means of propulsion for the chopper, for guiding the same; means 26 to raise and lower the chopper A; and means 27 providing a mould board for association with the chopper A.

As for the two ground wheels 20 and 21, these are, preferably, substantially alike insofar as their peripheries or rim portions 30 are concerned but only one of them need be provided with spokes 31. In the example shown, the wheel 20, shown more particularly in Figure 2, carries the spokes 31 which radiate from a hub 32, having a bore 33. These spokes 31 also provide support for a portion of the means 24 to be subsequently described. Extending radially outwardly from the peripheries of the wheels 20 and 21 may be conventional calks 34 which are supplemented by portions of the means 22 to be next described.

The means 22 connecting the wheels 20 and 21 are not merely connecting bars or the like but are of special shape and disposition, have dual functions, and are shown more particularly in Figures 2 and 15. Disposed in equally spaced-apart relationship about the wheels 20 and 21, preferably, firmly secured thereto and connecting the spaced-apart wheels are groups of two each of substantially flat plates or walls 35. These plates or walls are provided, at their outer ends with longitudinally extending slots 36 adapted to accommodate the wheel rim portion 30 and each pair of plates 35 is arranged to diverge outwardly whereby a slot 37, with an inner narrow mouth 38 and an outer wider mouth is provided. Those portions of the plates 35 which extend outwardly of the peripheries of the rim portions 30 function as calks to afford traction for the wheels so, if expedient, the conventional calks 34 may be omitted. One plate 35 of each adjacent pair of plates also provides a guideway for the means 24 to be subsequently detailed.

Each of the chopping knives 23, shown more particularly in Figures 3, 4, 5, 6 and 10, includes an elongated blade 40 having a cutting edge 41 along one longitudinal edge and end edges substantially normal to the edge 41. Each knife 23 also has a means to secure it to the means 24 to actuate the knives. This may be a socketed member 43, secured to the longitudinal edge portion of the blade 40 opposite the cutting edge 41 and disposed substantially midway the end edges. Suitable removable pins 44, as in Figure 6, may be provided extending through the socketed member 43 and a portion of the means 24, to be described, for the purpose mentioned. Each blade 40 extends from closely adjacent one plate 35 of one pair of plates to the next adjacent plate 35 of the next adjacent pair of plates, instead of extending from rim 20 to rim 21, so that the sweep of each knife 23 is toward and away from each rim, guided, to some extent by the adjacent plates 35.

Referring now to the means 24 to actuate the knives 23 and shown mostly in Figures 3 to 8, this includes a plurality of knife carriers 45, one for each knife, and shown particularly in Figure 6. Each carrier 45 may have an outermost cylindrical shank portion 46 provided with suitable perforations at adjacent its outermost end so that, when this outermost end is disposed within a socketed member 43 of a knife and suitable pins 44 are employed, the knife 23 and carrier 45 will be detachably secured together.

Adjacent the inner end of the cylindrical shank portion 46 is mounted a cam surface-engaging roller 47, shown particularly in Figures 4 and 6, and provided for a purpose to be described, preferably with a grooved periphery, and with the shank 46 providing its pivot. Any suitable means, as the collar 48 and shoulder 49 on the carrier 45 may be provided to prevent undesired movement of the roller 47 longitudinally of the shank portions 46.

Inwardly of the shank portion 46 of each carrier 45, the latter may be enlarged in diameter and terminate at its inner end in a tongue 50 provided with a perforation through which extends a suitable pivot pin 51 carried by a pair of bearings 52 extending radially from the hub 32. Extending outwardly from each bearing 52 is a lug 53 carrying a bar or stop 54 to limit pivotal movement of the carrier 45, in one direction, as is apparent in Figure 6.

Limiting pivotal movement of the carriers 45 in the opposite direction is means, preferably carried by the plates 35, and comprising for each carrier 45, a bar or stop 55, shown for example in Figure 3, bridging the adjacent plates 35 of each two pairs and disposed adjacent an end of the plates. In order to reduce noise, the bars 55 may be provided with rubber or like sleeves 56 disposed to be contacted by the carriers at their shank portions 46.

Normally, the carriers are urged toward these stops or bars 55 by expansion coil springs 57, one for each carrier, shown for example in Figure 6. One end of the spring 57 abuts a carrier 45 and may be detachably held thereagainst by a spherical element 58 secured to the carrier as by welding. The other end of the coil spring 57 abuts a preferably hooplike support 59 secured, as by welding, to the spokes 31 and shown more particularly in Figure 2. This support 59 carries a plurality of spherical elements 60, like the elements 58, which may be welded to the support 59. As may be seen in Figure 6 these elements 58 and 60 are of such a size that their diameters exceed the inner diameters of the springs 57 but, since they are preferably smooth, the ends of the springs may be readily slipped over the several spheres to hold the springs in place.

The relative positions of the several knives 23 are governed by a spiral cam track 61, less than one convolution in length, shown particularly in Figures 3, 7 and 8, but also in Figures 4 and 5. The cam track 61 may be a length of rigid rod, bent or otherwise formed to shape, and supported mainly by spokes 62 extending radially from a hub 63 which is suitably secured, as by a key, to a shaft 64 extending through a bore 65 in the hub 63. The hub 63 mounts the hub 32, as shown in Figure 9. Any suitable means may be provided to prevent undesired travel of the hub 32 longitudinally of the hub 63. The peripheries of the rollers 47, rotatably carried by the carriers 45, engage the cam track.

Of course, the hub 63 and shaft 64 do not rotate with the rotation of the wheels 20 and 21, so the cam track remains stationary, during normal rotation of the ground wheels.

So that the knives 23 will sweep across the chopper A, from rim to rim of the wheels 20 and 21, at the proper time, the cam track 61 must be properly disposed and terminate properly. That is, the knives 25, one after another must be moved, by the cooperation of the cam track 61 and carriers 45, against the tension of the retracted coil springs 57 to positions so that, as each knife 25, in turn, reaches its lowermost position (as the wheels 20 and 21 rotate) it will leave one end portion 66 of the cam track (this end portion being farthest from the most adjacent bar or stop 55 and is the lowermost end portion of the cam track) and, urged by a spring 57, will sweep across the space between the peripheries of the rims 30 of the wheels 20 and 21 and, consequently, cut down at, or a little below, the ground level, any vegetation in its path. However, as soon as the wheels 20 and 21 have rotated enough for the roller 47 (of the carrier 45 supporting the knife 25 just actuated to cut) to contact the other end portion 67 of the cam track, this knife will start to move backwards from the rim 30 of the wheel 21 toward the rim 30 of the wheel 20, and will gradually continue this movement as the wheels rotate forwardly.

Thus, there will be alternate patches of vegetation cut along a row, while other alternate patches will remain standing, as is now apparent and these standing patches will not be levelled since the young vegetation will extend into the slots 37 out of the way of the movement of the knives.

The guide means 25 to couple the chopper A to a suitable vehicle B for guiding the ground wheels 20 and 21, may be a pair of elongated members 70, as of channel iron fixedly secured, one to each end of the shaft 64 and pivotally secured at their rearward ends 71 to a bracket 72 extending from a conventional double U-couple 73, shown in Figures 11 and 12, for fixedly securing the bracket 72 to the vehicle B.

The means 26 to raise and lower the chopper A may comprise a conventional yoke 75 connected with the chopper A by being secured to the outer ends of the channel iron members 70 and extending upwardly to connect with angle iron braces 76, from preferably the upper end of which extends rearwardly a rod or link 77 pivoted to a lever 78 carried by the vehicle B and which may be held in a fixed position by a conventional latch or retainer 79 which may be carried by the steering wheel column of the vehicle A. It is obvious that the release of the lever 78 from the latch 79 will permit the chopper A to descend to the ground level for use.

As for the means 27, shown more particularly in Figures 13 and 14, to provide a mould board for association with the novel chopper, the same preferably includes a support or bracket 80 which extends from preferably the hub 63 with its longitudinal axis normal to the longitudinal axis of the member 70 and to the outer end of which support 80 there is fixed a downwardly-extending portion 81 pivotally supporting the upper end of straps 82 to the lower end of which are secured the mould board 83 to be disposed with its longitudinal axis substantially normal to the axes of rotation of the wheels 20 and 21.

Various changes may be made to the form of the invention herein shown and described without departing from the spirit of the invention or scope of the claims.

What is claimed is:

1. In a cotton chopper, two spaced-apart ground wheels, with the axes of rotation thereof substantially coincident, one wheel having a hub, a rim portion and spokes joining the hub and rim portion, the other wheel being free of spokes; means providing calks and connecting the wheels together at their rims, comprising a plurality of plates, disposed in pairs with the plates of each pair diverging outwardly and extending inwardly of said rim portions and secured to said wheels; a plurality of chopper knives disposed between the adjacent plates of each two adjacent pairs thereof; means for alternately moving each of said chopper knives, in turn, toward and away from each of said wheels, including oscillating carriers mounting said knives; and means to limit movement of said knives in one direction, comprising a bar carried by and bridging the inner ends of each of said adjacent plates of each two adjacent pairs thereof and disposed adjacent said carriers and within the path of travel of adjacent carriers.

2. In a cotton chopper, two spaced-apart ground wheels, with the axes of rotation thereof substantially coincident, one wheel having a hub, a rim portion and spokes joining the hub and rim portion, the other wheel being free of spokes; means providing calks and connecting the wheels together at their rims, comprising a plurality of plates, disposed in pairs with the plates of each pair diverging outwardly and extending inwardly of said rim portions and secured to said wheels; a plurality of chopper knives disposed between the adjacent plates of each two adjacent pairs thereof; means for alternately moving each of said chopper knives, in turn, toward and away from each of said wheels including oscillating carriers mounting said knives; and means to limit movement of said knives in one direction, comprising a bar carried by and bridging the inner ends of each of said adjacent plates of each two adjacent pairs thereof and disposed adjacent said carriers and within the path of travel of adjacent carriers, and a carrier-contacting resilient sleeve carried by each bar and disposed within the path of travel of an adjacent carrier.

LUCIAN R. DABBS.
LAWRENCE R. PALMER.

REFERENCES CITED

The following references are of record in the file of this patent:

UNITED STATES PATENTS

| Number | Name | Date |
| --- | --- | --- |
| 697,028 | Shields | Apr. 8, 1902 |
| 843,460 | Hurst | Feb. 5, 1907 |
| 1,211,971 | Siemann | Jan. 9, 1917 |
| 1,452,046 | Henry | Apr. 17, 1923 |